United States Patent
Bello Ravelo

(10) Patent No.: US 12,342,953 B2
(45) Date of Patent: Jul. 1, 2025

(54) FULL PEELER

(71) Applicant: Jose Ernesto Bello Ravelo, Miami, FL (US)

(72) Inventor: Jose Ernesto Bello Ravelo, Miami, FL (US)

( * ) Notice: Subject to any disclaimer, the term of this patent is extended or adjusted under 35 U.S.C. 154(b) by 291 days.

(21) Appl. No.: 17/835,943

(22) Filed: Jun. 8, 2022

(65) Prior Publication Data

US 2022/0346585 A1 Nov. 3, 2022

Related U.S. Application Data

(60) Provisional application No. 63/208,095, filed on Jun. 8, 2021.

(51) Int. Cl.
*A47J 17/02* (2006.01)

(52) U.S. Cl.
CPC .................... *A47J 17/02* (2013.01)

(58) Field of Classification Search
CPC .............. A47J 17/02; A47J 17/04; A47J 17/08
USPC ......... 30/279.2–279.6; D7/693, 695; 99/584, 99/588, 590
See application file for complete search history.

(56) References Cited

U.S. PATENT DOCUMENTS

| | | | | |
|---|---|---|---|---|
| 86,741 A * | 2/1869 | Sutton | ..................... | A47J 17/02 30/279.6 |
| 409,629 A * | 8/1889 | Brock | ..................... | A47J 17/02 30/279.6 |
| 423,150 A * | 3/1890 | Haines | ..................... | A47J 17/02 30/279.6 |
| 531,404 A * | 12/1894 | Barnum | ..................... | A47J 17/02 30/279.2 |
| 536,521 A * | 3/1895 | Hayes | ..................... | A47J 17/02 30/279.6 |
| 850,871 A * | 4/1907 | Nagasse | ..................... | A47J 17/02 D7/695 |
| 918,893 A * | 4/1909 | Nielsen | ..................... | F25C 5/043 30/136.5 |
| 1,082,802 A * | 12/1913 | Full | ..................... | A01G 3/06 30/337 |
| 1,150,629 A * | 8/1915 | Satow | ..................... | A47J 17/02 30/279.6 |
| 1,204,179 A * | 11/1916 | Myers | ..................... | A47J 17/02 30/298 |
| 1,367,876 A * | 2/1921 | Heffner | ..................... | A47J 17/02 30/279.6 |
| 1,627,901 A * | 5/1927 | Hills | ..................... | B27L 1/06 30/280 |

(Continued)

FOREIGN PATENT DOCUMENTS

| CH | 700123 B1 | * | 6/2010 | ............. | A47J 17/02 |
| DE | 2411049 A1 | * | 9/1975 | ............. | A47J 17/02 |

(Continued)

*Primary Examiner* — Jason Daniel Prone

(57) ABSTRACT

An L-shaped peeler with first and second legs. The first leg featuring grip protrusions and the second leg including a cutout. A cutting member in the cutout so that the cutting member is outwardly offset from the second leg. The user grasps the first leg and one or more of the grip protrusions and moves the second leg over a piece of fruit or a vegetable to be peeled so that the cutting member peels the fruit or vegetable and a removed portion travels through the cutout adjacent the sharpened linear portion.

1 Claim, 13 Drawing Sheets

(56) References Cited

U.S. PATENT DOCUMENTS

| | | | | |
|---|---|---|---|---|
| 2,010,414 | A * | 8/1935 | Rekonty | A47J 17/02 30/280 |
| 2,173,751 | A * | 9/1939 | Burkhart | A01F 11/06 30/279.6 |
| 2,266,209 | A * | 12/1941 | Jones | A01F 11/06 30/280 |
| 2,354,607 | A * | 7/1944 | O'Neil | A47J 17/02 30/284 |
| 2,376,451 | A * | 5/1945 | Polasik | A47J 17/02 30/284 |
| D161,534 | S * | 1/1951 | Riley | D7/693 |
| 2,829,434 | A * | 4/1958 | Schweikert | B26B 27/002 30/280 |
| 3,328,877 | A * | 7/1967 | Brown | A47J 17/02 D7/695 |
| 3,414,030 | A * | 12/1968 | Popeil | A47J 17/02 D7/695 |
| D246,087 | S * | 10/1977 | Peterson | D7/695 |
| 4,221,222 | A * | 9/1980 | Detsch | A61B 17/322 30/280 |
| 4,574,479 | A * | 3/1986 | Gramann | B26B 3/00 D7/693 |
| D283,579 | S * | 4/1986 | Peterson | D7/695 |
| 5,062,210 | A * | 11/1991 | Arroyo, Jr. | B26B 5/006 30/317 |
| 5,140,752 | A * | 8/1992 | Kasprzak | B26B 5/006 30/169 |
| 5,196,036 | A * | 3/1993 | Lamas | A01G 5/00 47/1.01 R |
| 5,237,749 | A * | 8/1993 | Henning | A47J 17/08 30/123.6 |
| 5,251,377 | A * | 10/1993 | Ho | A47J 17/02 D7/693 |
| 5,471,746 | A * | 12/1995 | Agrimis | A47J 17/02 30/279.6 |
| 5,659,962 | A * | 8/1997 | Tagou | A47J 17/02 30/279.6 |
| 6,722,042 | B1 * | 4/2004 | Naville, Jr. | B26B 3/00 30/279.6 |
| D501,123 | S * | 1/2005 | Rasa | D7/695 |
| D542,104 | S * | 5/2007 | Holcomb | D7/695 |
| 7,721,449 | B2 * | 5/2010 | Rasa | A47J 17/02 30/279.6 |
| D618,071 | S * | 6/2010 | Jossem | D7/693 |
| D812,438 | S * | 3/2018 | Jauer | D7/693 |
| 10,086,311 | B2 * | 10/2018 | Sakai | A63H 33/04 |
| D857,467 | S * | 8/2019 | Joseph | D7/695 |
| 10,736,454 | B1 * | 8/2020 | Serrano | A47J 17/02 |
| 10,806,289 | B2 * | 10/2020 | Takabu | A47J 17/02 |
| 11,518,052 | B2 * | 12/2022 | Swilley | A47J 17/02 |
| 2017/0325615 | A1 * | 11/2017 | Takabu | A47J 17/02 |

FOREIGN PATENT DOCUMENTS

| | | | | |
|---|---|---|---|---|
| DE | 19538863 | A1 * | 4/1997 | A47J 17/02 |
| FR | 1190319 | A * | 10/1959 | A47J 17/02 |
| GB | 2164839 | A * | 4/1986 | A47J 17/02 |
| JP | 10156062 | A * | 6/1998 | A47J 17/02 |
| JP | 3581709 | B1 * | 10/2004 | A47J 17/02 |
| JP | 3198664 | U * | 7/2015 | A47J 17/02 |

* cited by examiner

FULL PEELER

BACKGROUND

There is an immense record of food cutters and peelers that goes back to the beginnings of the industrial revolution. The designs and models are vast from manual devices to devices with their own dispenser or storage place to devices that both cut and peel. There are simple peelers of only one piece to whole peeling systems of twelve and more pieces. The materials in which these peelers vary in spite of most having stainless steel cutting blades.

SUMMARY

The peeler is made with a one-piece body featuring an L-shape. A handle/grip first leg with different grip protrusions on both sides of the peeler allows the fingers/thumb to hold the peeler more firmly. A support base second leg having a cutout incorporating a cutter. The first and second legs define an angle of 90 degrees. The first and second legs can have different shapes and designs responding to different benefits.

The peeler has a design which allows for easy maneuverability and a secure and firm grip. The small size gives the peeler a low weight which is ideal and allows for storage and better manageability. This peeler's design makes it very easy to wash and dry. The peeler does not exceed the contour of the user's hand making it safe to handle and easy used plus is the safest in its plastic version.

The peeler is held by gripping the first leg between a finger and thumb of the same hand of the user. The thumb also touches an inner portion of the second leg allowing for better comfort and better precision during cutting.

The peeler can be used by a right or a left-handed person, this does not alter efficiency or impede a cutting operation, even when the peeler is used in different innovative ways, the results will be the same.

The peeler can have additional features allowing for the peeler to perform additional functions (serrated design for grating). The additional features can be incorporated into existing portions of the peeler. The user may have to grip the peeler in a different manner than the grip used when a peeling function takes place.

BRIEF DESCRIPTION OF THE DRAWINGS

In order to create a better understanding of the product and its use, we make an exhibition of all the images and later we offer more detailed information of the piece.

DETAILED DESCRIPTION OF THE DRAWINGS

Figure 1:
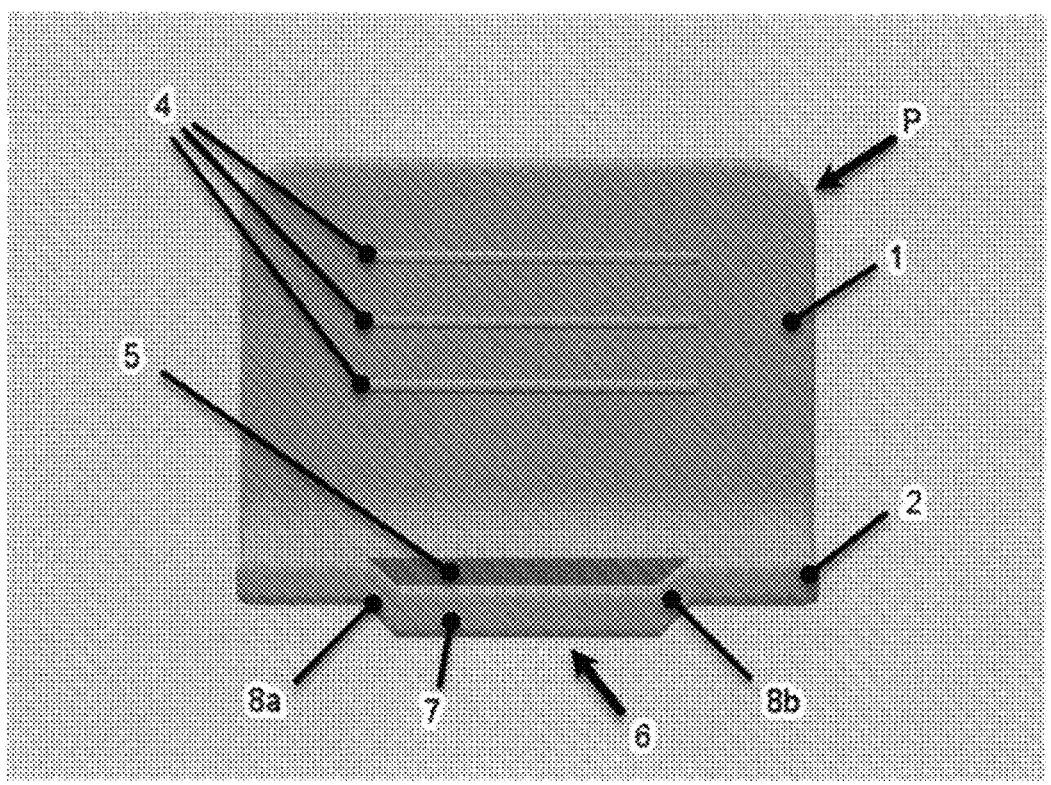
FIG. 1 is a front view of the peeler.

FIGS. 1-7 show different views of the peeler (P). The peeler (P) can be made of plastic. The peeler (P) has an L-shaped body (3) with a first leg (1) and a second leg (2). The first leg (1) extends away from the second leg (2) in a first direction. The first leg (1) having grip protrusions (4) on either side. The second leg (2) defining a central cutout (5) having a cutting member (6) therein. The cutting member (6) having a sharpened linear portion (7) and two angled portions (8a, 8b) respectively connecting the linear portion (7) to the second leg (2) so that the linear portion (7) is offset from the second leg (2) in a second direction opposite to the first direction. The user grasps the first leg (1) and one or more of the grip protrusions (4) and moves the second leg over an item to be peeled (FIG. 8) so that the sharpened linear portion peels the item and a removed portion (R) of the item travels through the cutout (5) adjacent the sharpened linear portion (7).

FIG. 1 shows a front view of the peeler (P). The upper part of first leg (1) has protrusions (4) in the form of lines that allow the grip to become secure and steady. The inside or upper surface of the second leg (2) is completely flat and cutting member (6) extends from the outside or lower surface of the second leg (2) so that the cutting member (6) be below the second leg (2). The sharpened linear portion (7) of the cutting member (6) has a sloping cutting edge.

Figure 2:
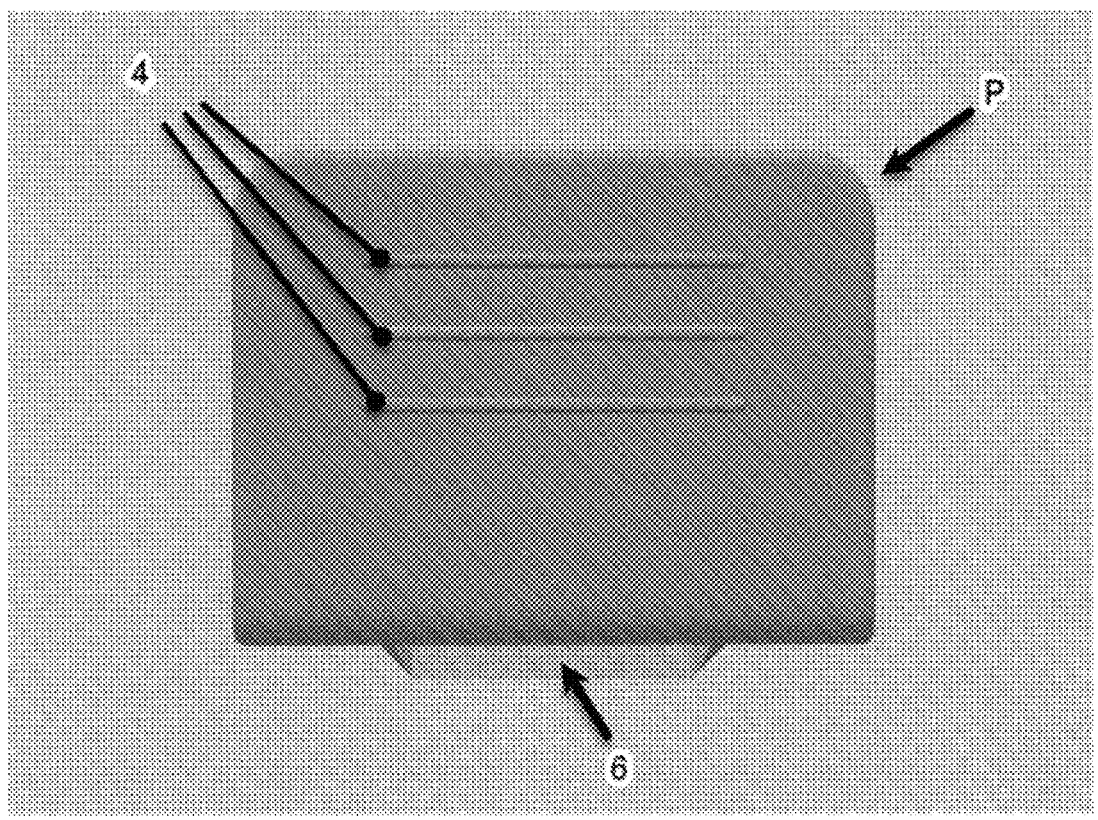
FIG. 2 is a rear view of the peeler.

FIG. 2 shows the rear view of the peeler (P). The upper part of the first leg shows additional protrusions (4) that are opposite the protrusions (4) seen in FIG. 1.

Figure 3:
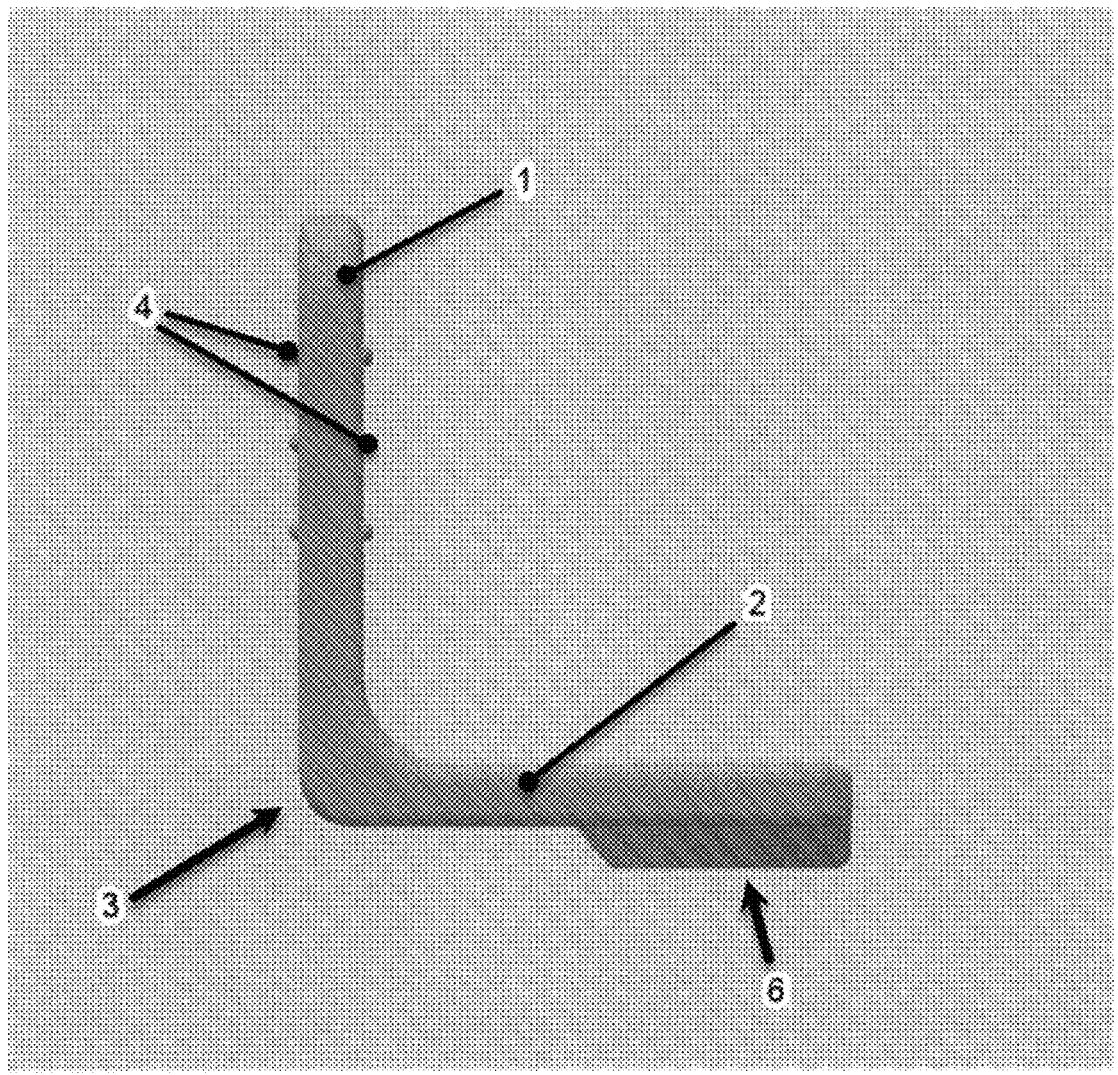
FIG. 3 is a side view of the peeler.

FIG. 3 shows a side view of the peeler (P). The first leg (1) and the second leg (2) define a 90-degree angle. An upper portion of the first leg (1) completely straight with a design to enhance the grip of the user. An outer portion of the second leg (2) is flat.

Figure 4:
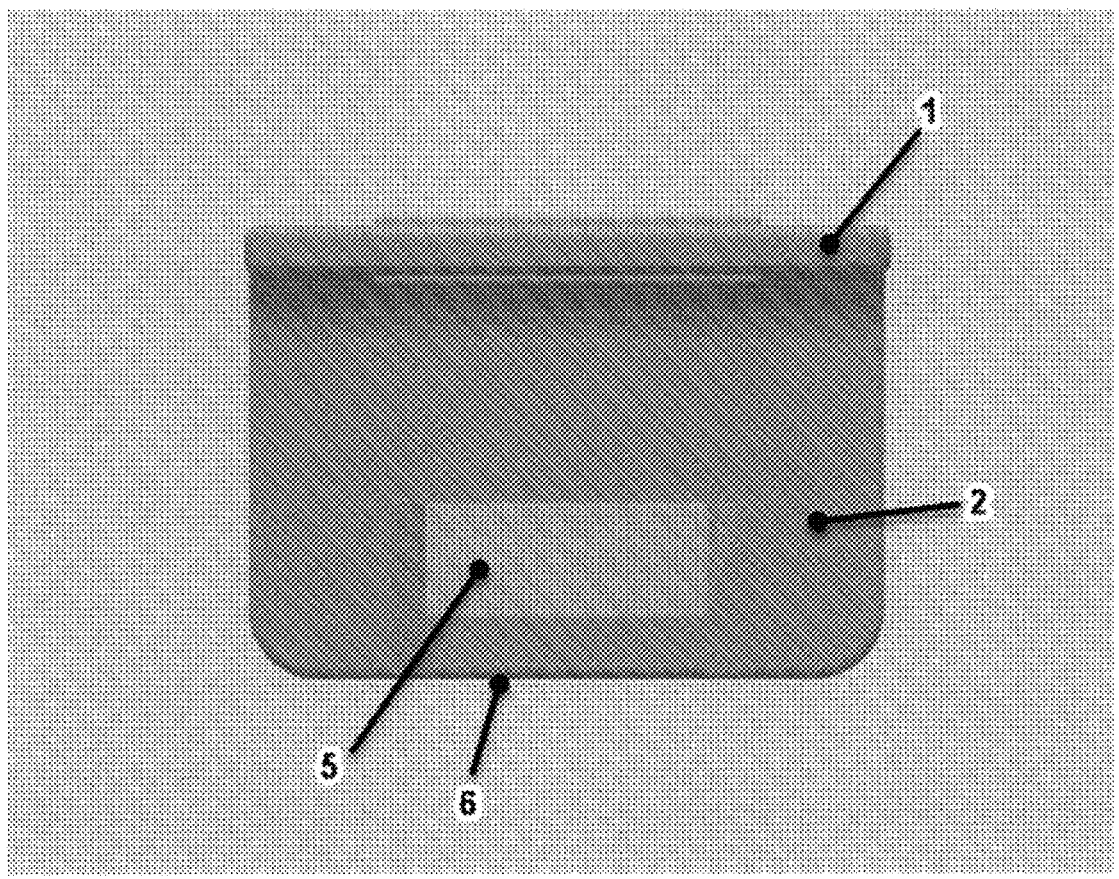
FIG. 4 is a top view of the peeler.
Figure 5:
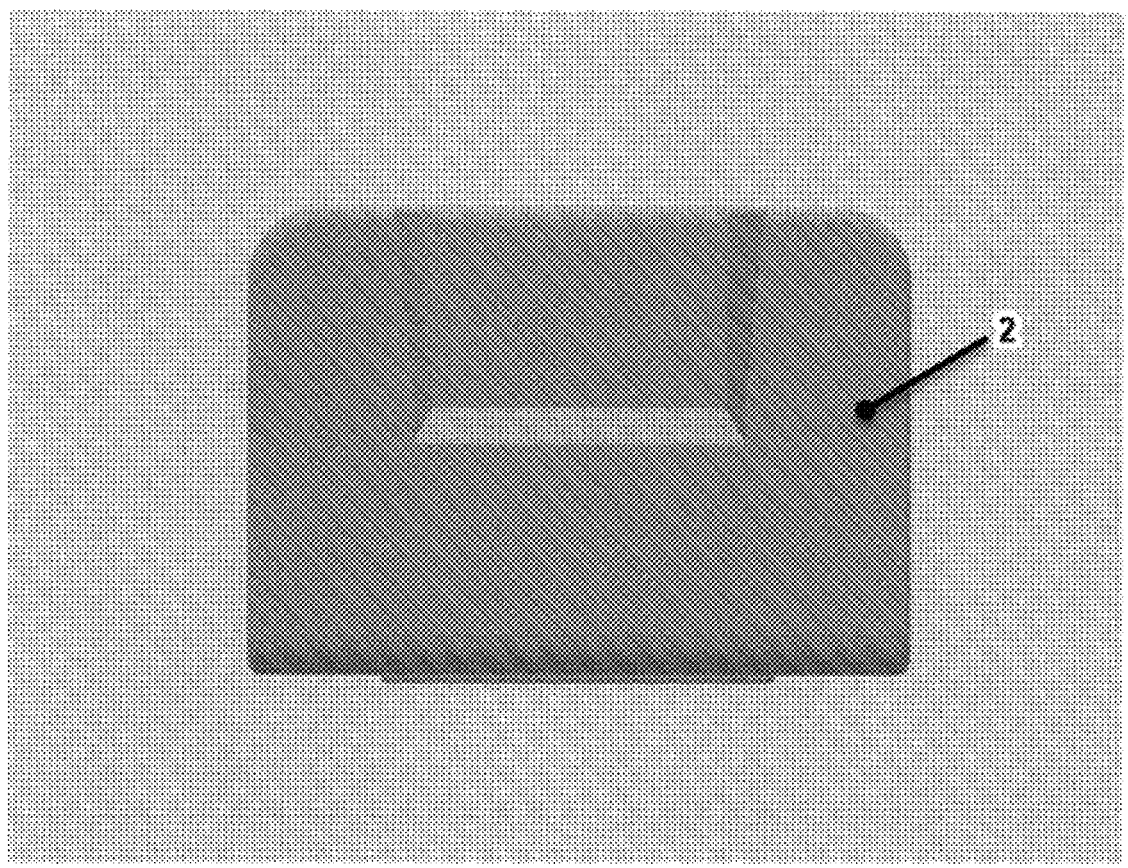
FIG. 5 is a bottom view of the peeler.
Figure 6:
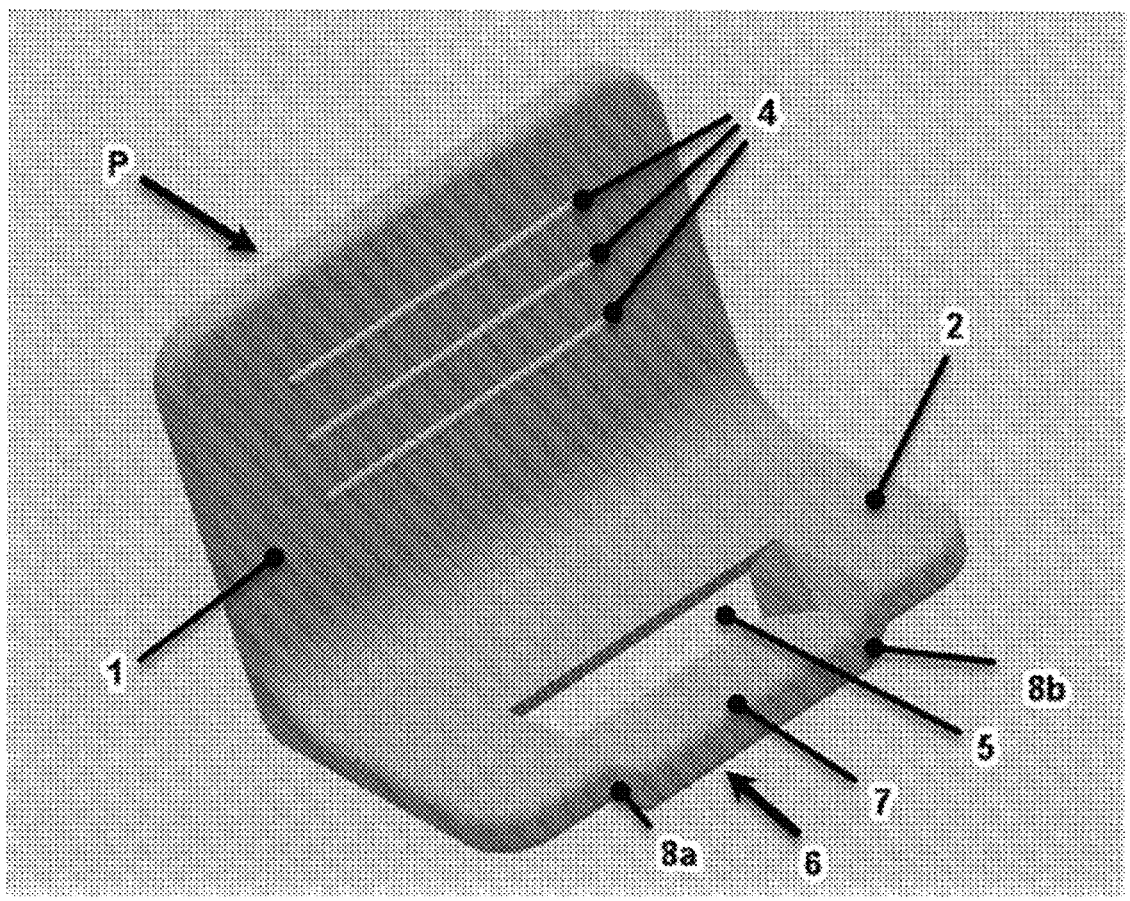
FIG. 6 is a perspective view of the front of the peeler.
Figure 7:
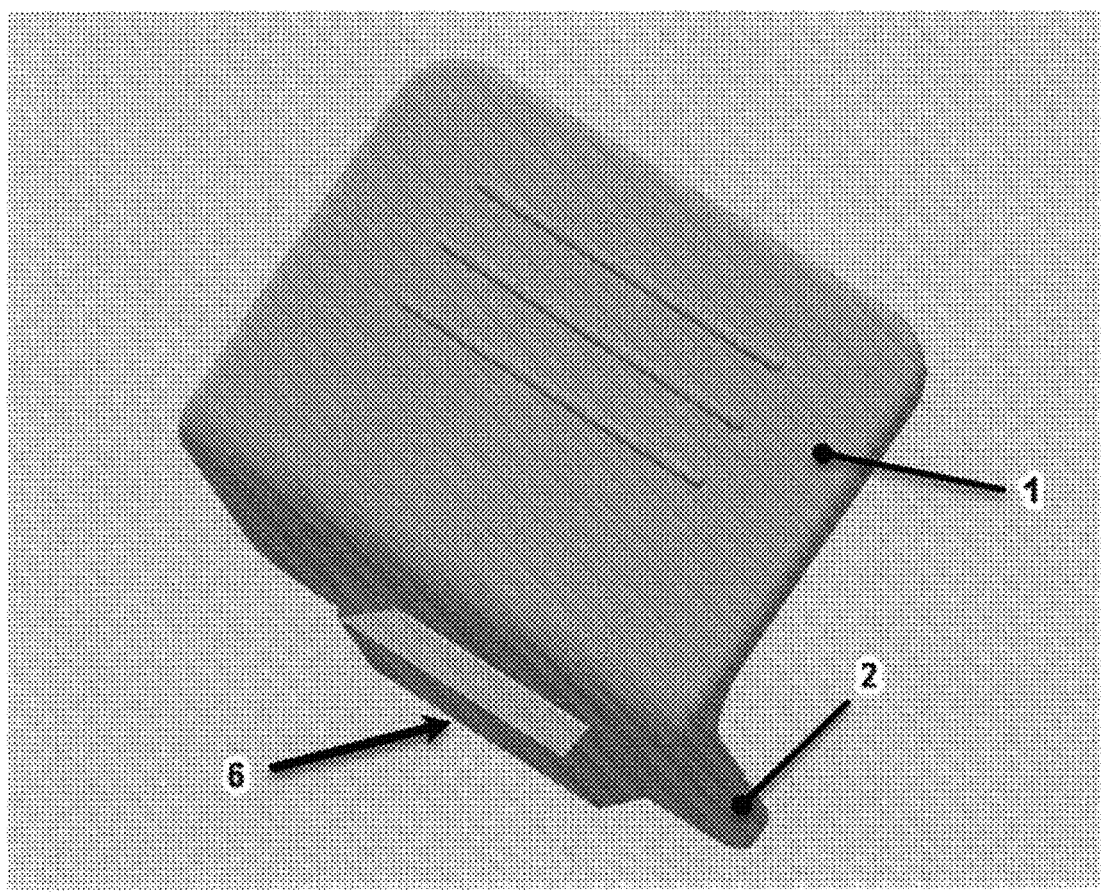
FIG. 7 is a perspective view of the back of the peeler.

FIG. 4 shows a top view of the peeler (P). Cutout (5) is in an outer portion of the second leg (2) away from the first leg (1). The cutting member (6) is in an outer portion of the cutout (5).

Figure 8:
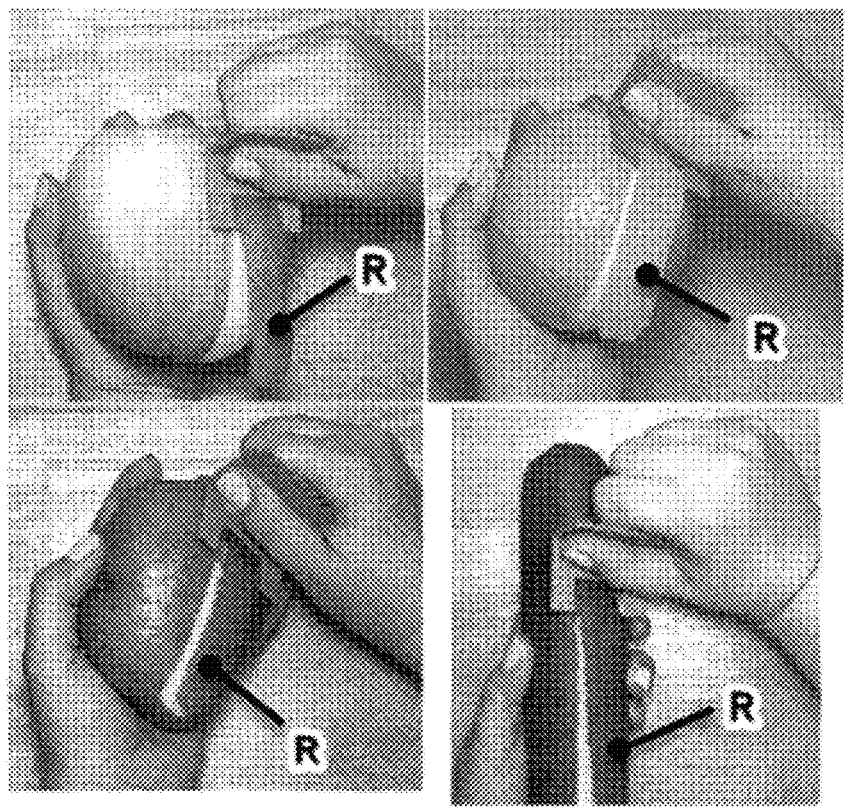
FIG. 8 is multiple views of the peeler peeling different products.

FIG. 8 shows different images of the peeler (P) performing a peeling function with different fruits and vegetables. The removed portion (R) is shown after traveling through the cutout (5). The grip position of the user's hand in all of the images is just a suggested position.

Figure 9:
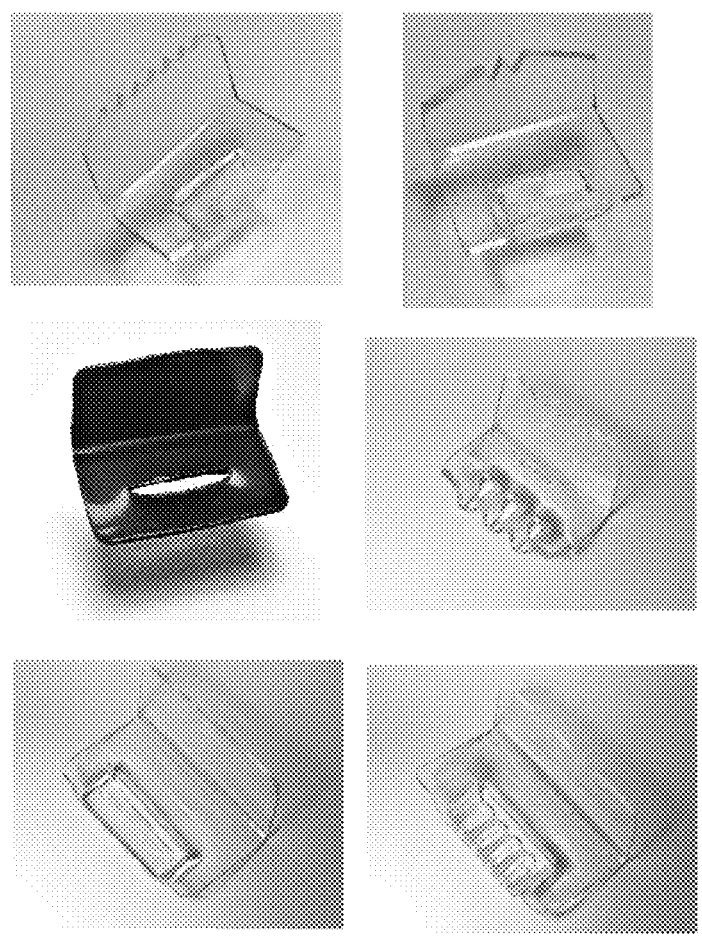
FIG. 9 is a view of different models of peelers.
Figure 10:
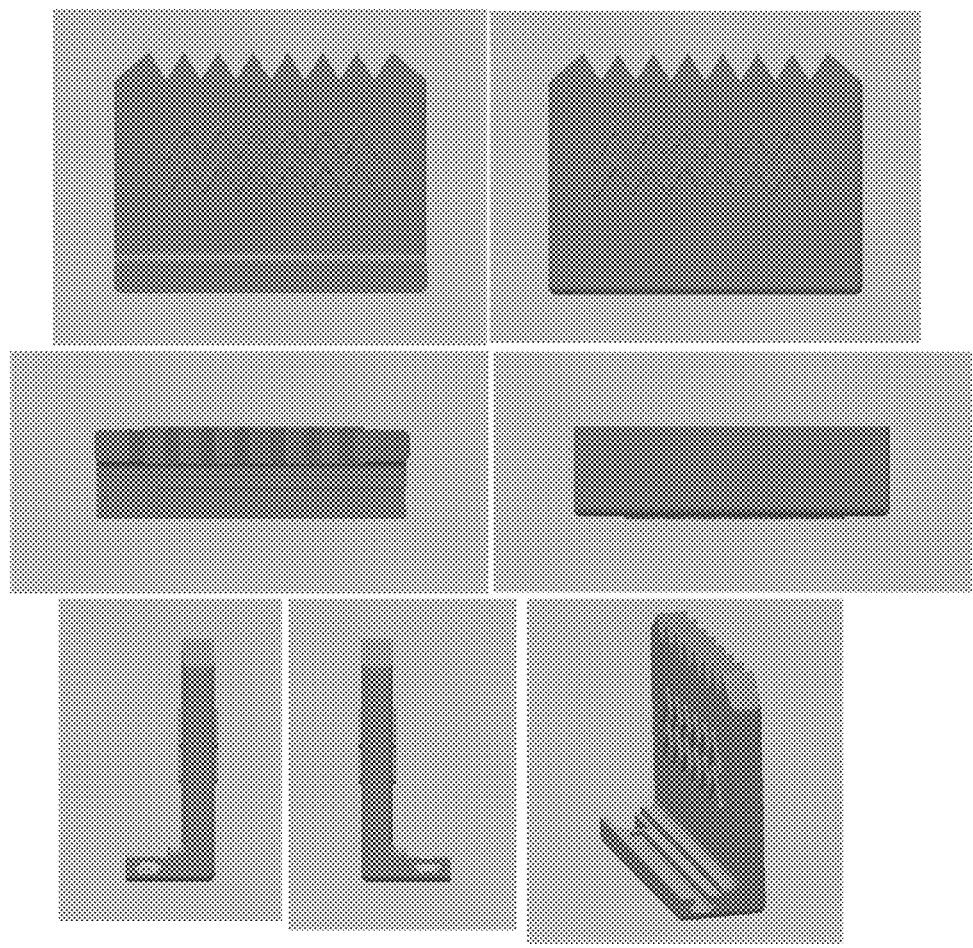
FIG. 10 is multiple views of an alternate peeler.
Figure 11:
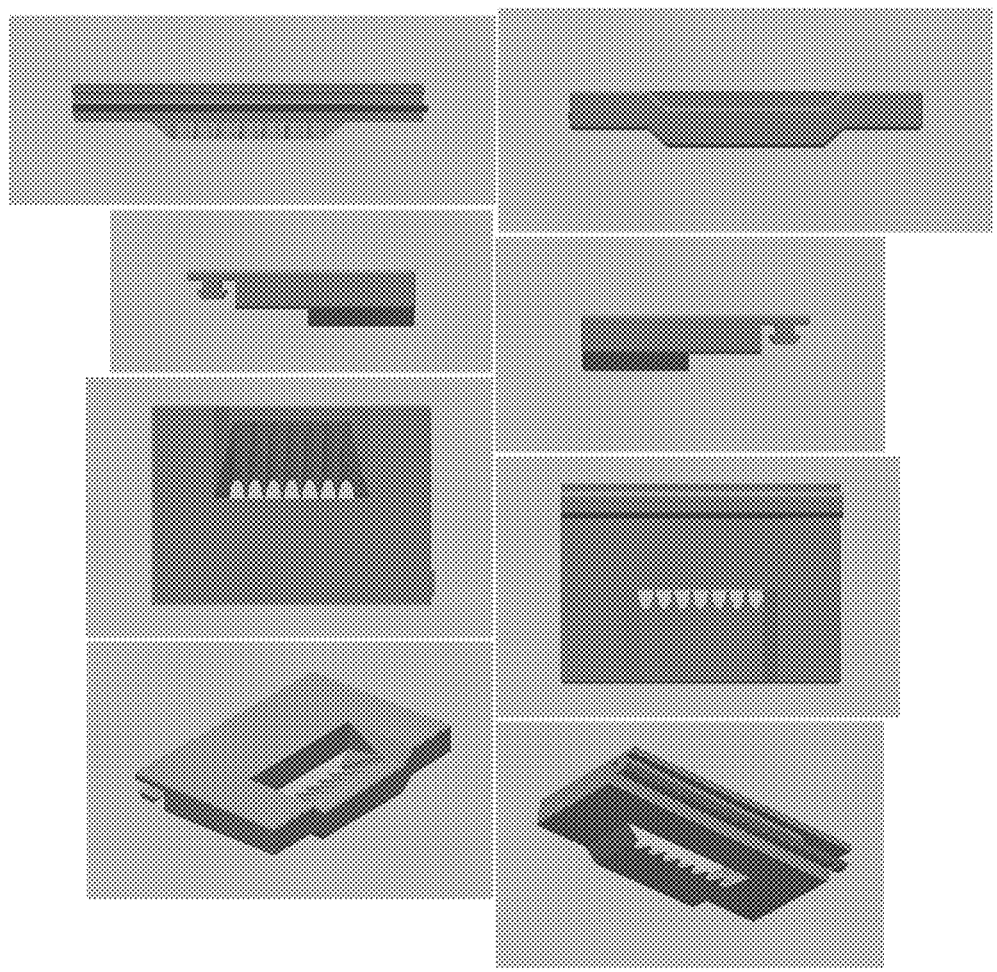
FIG. 11 is multiple views of an alternate second leg of a peeler.
Figure 12:
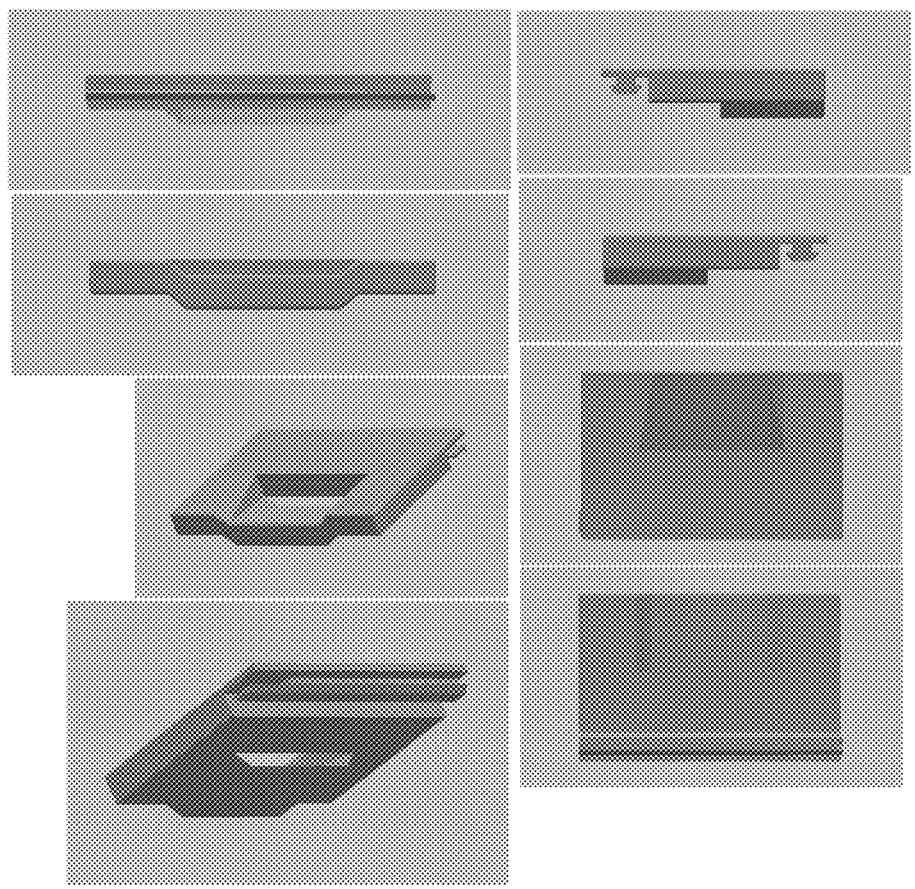
FIG. 12 is multiple views of an alternate second leg of a peeler.
Figure 13:
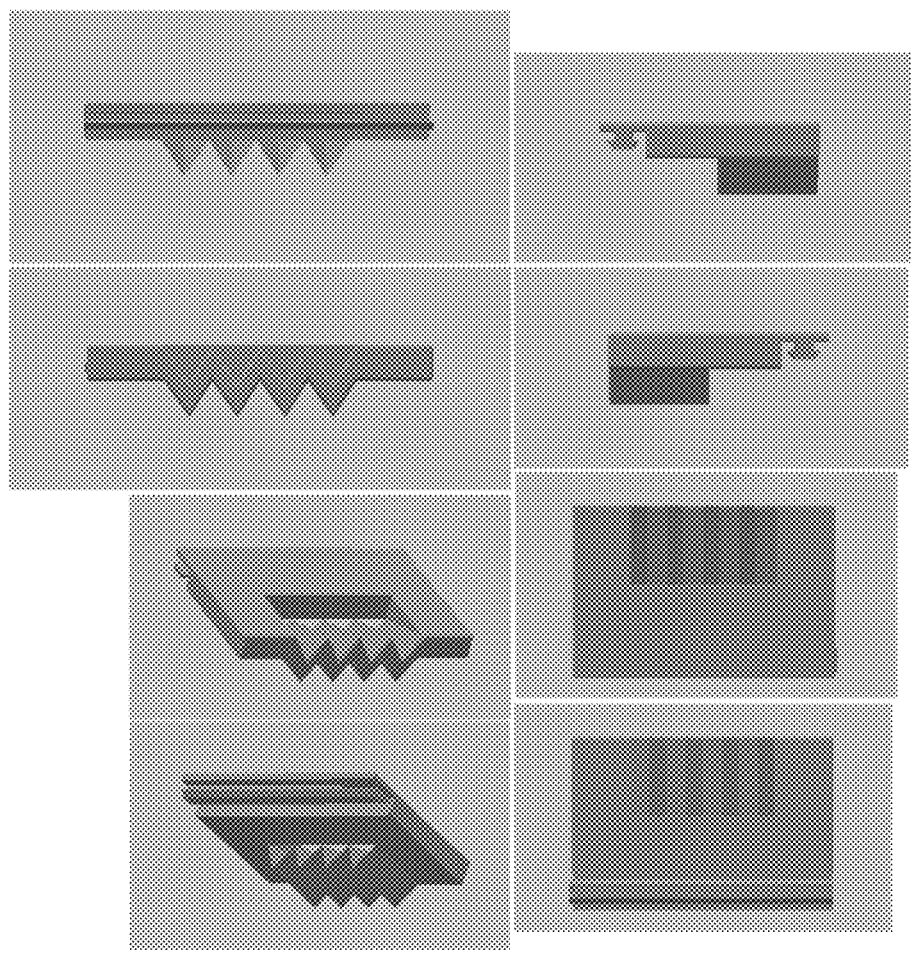
FIG. 13 is multiple views of an alternate second leg of a peeler.

FIGS. 9-11 show alternate peelers. These peelers can have additional features allowing for the peeler to perform additional functions (serrated design for grating). The additional features can be incorporated into existing portions of the peeler. These peelers may have more than one cutting member which may be in alternate locations. These peelers may incorporate cutting members with alternate shapes. The user may have to grip the peeler in a different manner than the grip used when a peeling function takes place.

The invention claimed is:
1. A peeler comprising:
a first leg and a second leg defining an L-shaped body, the first leg extending away from the second leg in a first direction, the first leg having at least one grip protrusion, and the second leg defining a central cutout;
a cutting member in the cutout, the cutting member having a sharpened linear portion and two angled portions respectively connecting the sharpened linear portion to the second leg so that the sharpened linear portion is offset from the second leg in a second direction opposite to the first direction;

and wherein a user grasps the first leg and the at least one grip protrusion and the second leg is moved over an item to be peeled so that the sharpened linear portion peels the item and a removed portion of the item travels through the cutout adjacent the sharpened linear portion.

* * * * *